United States Patent [19]

Yoshida et al.

[11] Patent Number: 4,757,266
[45] Date of Patent: Jul. 12, 1988

[54] DEMODULATION SYSTEM CAPABLE OF ESTABLISHING SYNCHRONIZATION IN A TRANSIENT STATE

[75] Inventors: Yasuharu Yoshida; Masato Tahara; Manabu Yagi; Toru Matsuura, all of Tokyo, Japan

[73] Assignee: NEC Corporation, Tokyo, Japan

[21] Appl. No.: 896,985

[22] Filed: Aug. 15, 1986

[30] Foreign Application Priority Data

| Aug. 15, 1985 | [JP] | Japan | 60-178501 |
| Aug. 15, 1985 | [JP] | Japan | 60-178502 |
| Aug. 15, 1985 | [JP] | Japan | 60-178503 |
| Aug. 15, 1985 | [JP] | Japan | 60-178504 |

[51] Int. Cl.$^4$ .................. H03D 3/18; H03K 9/10
[52] U.S. Cl. .................. 329/50; 329/109; 329/135; 375/39
[58] Field of Search .......... 329/50, 109, 110, 122, 329/124, 135; 375/39, 81, 94, 120

[56] References Cited

U.S. PATENT DOCUMENTS 4,255,713 3/1981 Yoshida .................. 329/50

*Primary Examiner*—Eugene R. LaRoche
*Assistant Examiner*—David Mis
*Attorney, Agent, or Firm*—Sughrue, Mion, Zinn, Macpeak & Seas

[57] ABSTRACT

In a demodulation system comprising a demodulator (22) which demodulates a quadrature amplitude modulated signal into first and second sets of output digital signals by the use of a reference carrier signal (CA), a specific phase control signal is produced in a transient state by discriminating a plurality of areas and a plurality of zones defined on a phase plane of the modulated signal. The areas are defined by dividing the phase plane by both a pair of quadrant reference axes and a pair of auxiliary reference axes phase shifted by $\pi/4$ (radians) relative to the quadrant decision axes. The zones are defined along and adjacent to the auxiliary reference axes. First and second detection signals ($S_1$ and $S_2$) are produced by a read-only memory (35) as results of discrimination of the areas and the zones, respectively. The specific phase control signal is switched to a normal phase control signal produced in a normal state in the known manner. Alternatively, the first and the second detection signals may be supplied to a transversal equalizer (21) for controlling imaginary part weighting control signals.

12 Claims, 8 Drawing Sheets

DEMODULATION SYSTEM CAPABLE OF ESTABLISHING SYNCHRONIZATION IN A TRANSIENT STATE

BACKGROUND OF THE INVENTION

This invention relates to a demodulation system for use in demodulating a modulated signal into a pair of output digital signals. It should be noted throughout the instant specification that the modulated signal is subjected to multi-level quadrature amplitude modulation and can specify multiple levels. Accordingly, such a modulated signal will often be referred to as a multi-level quadrature amplitude modulated signal or a quadrature amplitude modulated signal.

In a microwave digital communication system, it is a recent trend that the levels of the quadrature amplitude modulated signal increase in number in order to carry out communication at a high efficiency. Such an increase of the number of the levels makes the quadrature amplitude modulated signal weak against various noises inflicted during transmission. In the demodulation system, any countermeasure must be taken against fading and distortions which may probably occur either singly or collectively in a transmission path.

A conventional demodulation system comprises a transversal equalizer responsive to a system input signal subjected to the quadrature amplitude modulation for equalizing the system input signal into an equalized signal. Supplied with the equalized signal as the modulated signal, a demodulator demodulates the modulated signal into first and second sets of demodulated digital signals by carrying out coherent detection.

With this structure, the transversal filter serves as the countermeasure against the fading and distortions while the coherent detection serves to reduce an influence of noises.

On carrying out the coherent detection, a reference carrier wave must be faithfully reproduced in the demodulator. In addition, jitter components should be radically reduced in the reference carrier wave.

In Japanese Unexamined Patent Publication No. Syô 57-131,151, namely, 131,151/1982, a proposal is offered for a carrier wave reproduction circuit which can reduce jitter components of the reference carrier wave by the use of a phase error signal which is produced by logically processing intermediate digital signals supplied from analog-to-digital (A/D) converters of the demodulator.

In the meantime, an amplitude of the quadrature amplitude modulated signal must be always kept at an optimum amplitude so as to reproduce the reference carrier wave of a high quality. To this end, automatic gain control (AGC) is usually carried out in the demodulator in cooperation with reproduction of the reference carrier wave.

According to the inventors' experimental studies, the carrier wave reproduction circuit is disadvantageous in that establishment of synchronization becomes difficult when the automatic gain control is insufficient and when an in-phase interference or distortion occurs in the transmission path. As a result, such difficulty requires a long time so as to establish the synchronization and often makes establishment of the synchronization impossible.

On the other hand, the transversal equalizer has a critical value of ability of equalization which will be called a first critical value and which is defined when the distortions, namely, intersymbol interferences vary from a small state thereof to a large one. The transversal equalizer has another critical value of ability of equalization that will be called a second critical value and that is defined when the transversal equalizer is recovered from an inoperable state to an operable state by decreasing an amount of distortions. Ideally, the second critical value is equal to the first critical value. Practically, the second critical value is, however, extremely smaller than the first critical value. This means that a long time is required in recovering the transversal equalizer into the operable state once the transversal equalizer is put into the inoperable state.

SUMMARY OF THE INVENTION

It is an object of this invention to provide a demodulation system which is capable of faithfully reproducing a reference carrier wave even during an insufficient automatic gain control operation and even in presence of an in-phase interference.

It is another object of this invention to provide a demodulation system of the type described, which can rapidly establish synchronization even in the presence of the in-phase interference.

It is a further object of this invention to provide a demodulation system of the type described, which can make the above-defined second critical value large in a transversal equalizer included in the demodulation system and can improve ability of equalization in the transversal equalizer.

A demodulation system to which this invention is applicable is for use in demodulating a quadrature amplitude modulated signal into first and second sets of output digital signals. The system comprises detecting means responsive to the modulated signal and a reference carrier wave for detecting a first and a second analog demodulated signal from the modulated signal with reference to the reference carrier wave, converting means coupled to the detecting means for converting the first and the second analog demodulated signals into first and second sets of intermediate digital signals, respectively, output means coupled to the converting means for deriving the first-set and the second-set output digital signals from the first and the second intermediate digital signals, respectively, and controllable carrier wave generating means responsive to a phase control signal for supplying the detecting means with the reference carrier wave. The modulated signal is specified on a phase plane having a pair of quadrant reference axes.

According to this invention, the demodulation system comprises logical operation means responsive to at least one of the first and the second analog demodulation signals and the first-set and the second-set intermediate digital signals for carrying out a logical operation to produce a specific phase control signal with reference to a plurality of areas and a plurality of zones of the phase plane with the phase plane divided into the areas by the quadrant reference axes and a pair of auxiliary reference axes which are phase shifted by $\pi/4$ (radians) relative to the quadrant reference axes. The zones are defined along and adjacent to the auxiliary reference axes.

The demodulation system further comprises signal supply means for selectively supplying the specific phase control signal to the controllable carrier wave generating means as the phase control signal.

DESCRIPTION OF THE PREFERRED EMBODIMENTS

Figure 1:
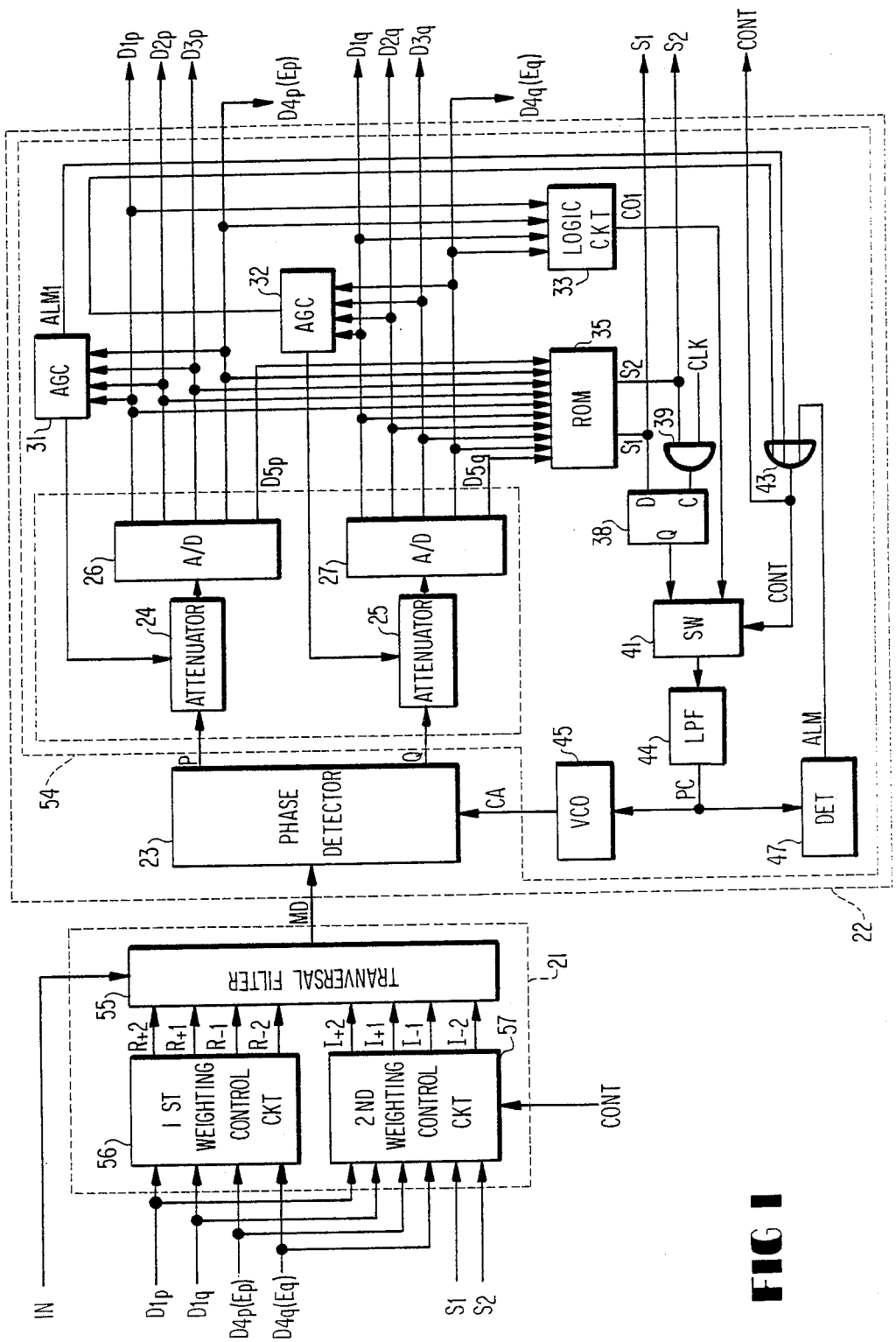
FIG. 1 shows a block diagram of a demodulation system according to a first embodiment of this invention.

Referring to FIG. 1, a demodulation system according to a first embodiment of this invention comprises a transversal equalizer 21 and a demodulator 22. Supplied with a system input signal IN, the transversal equalizer 21 equalizes the system input signal IN into an equalized signal in a manner to be described later. The equalized signal is sent to the demodulator 22 as a modulated signal MD. At any rate, each of the system input signal IN and the modulated signal MD is subjected to quadrature amplitude modulation (QAM) and has a plurality of signal points on a phase plane divided by a pair of quadrant reference axes into first through fourth quadrants. The number of the signal points may be, for example, 16, 64, 256, or 1024. It will be assumed merely for clarity of description that the number of the signal points is equal to 64. Accordingly, the quadrature amplitude modulation and the modulated signal MD may be referred to as 64 QAM and a 64 QAM signal, respectively.

Description will be at first made about the demodulator 22 for convenience of description. Briefly, the demodulator 22 serves to demodulate the modulated signal MD into a first set of output digital signals $O_p$ and a second set of output digital signals $O_q$. The first-set output digital signal $O_p$ is representative of in-phase components of the modulated signal MD while the second-set output digital signal $O_q$, quadrature phase components of the modulated signal MD. The first-set and the second-set output digital signals $O_p$ and $O_q$ consist of three first-set bits $D_{1p}$, $D_{2p}$, and $D_{3p}$ and three second-set bits $D_{1q}$, $D_{2q}$, and $D_{3q}$. A first one ($D_{1p}$ or $D_{1q}$) of the three bits may be considered as a most significant bit. The first bits $D_{1p}$ and $D_{1q}$ serve to decide each quadrant on the phase plane and may be referred to also as quadrant decision signals.

The demodulator 22 comprises a phase detector 23 which may be called a coherent detector and which is supplied with the modulated signal MD and a reference carrier signal or wave CA reproduced in a manner to be described later. Under the circumstances, the phase detector 23 carries out coherent detection to produce first and second analog demodulated signals P and Q which convey the in-phase and the quadrature phase components, respectively.

The first and the second analog demodulated signals P and Q are sent through variable attenuators 24 and 25 to first and second analog-to-digital (A/D) converters 26 and 27 and are converted into first and second sets of intermediate digital signals, each of which consists of five bits. The first through third ones of the five bits are common to those of each of the first-set and the second-set output digital signals $O_p$ and $O_q$ while the fourth bits $D_{4p}$ and $D_{4q}$ of the first-set and the second-set intermediate digital signals are representative of error components and will alternatively be called error signals $E_p$ and $E_q$. The fifth bit $D_{5p}$ or $D_{5q}$ of each intermediate digital signal set will be used as will become clear as the description proceeds.

Thus, a combination of the attenuators 24 and 25 and the first and the second analog-to-digital converters 26 and 27 may be named a converting circuit for converting the first and the second analog demodulated signals P and Q into the first-set and the second-set intermediate digital signals.

The first through third bits of the first-set intermediate digital signal are produced as the first-set output digital signal $O_p$. Likewise, the first through third bits of the second-set intermediate digital signal are produced as the second-set output digital signal $O_q$.

In addition, the first through fourth bits of the first and the second-set intermediate digital signals are delivered to first and second automatic gain controllers 31 and 32, respectively. The first and second automatic gain controllers 31 and 32 cooperate with the attenuators 24 and 25 so as to keep amplitudes of the first and the second analog demodulated signals P and Q at optimum amplitudes in a manner to be described later, respectively. The first bits $D_{1p}$ and $D_{1q}$ and the fourth bits $D_{4p}$ and $D_{4q}$ are delivered to a logic circuit 33 which may be similar in structure and operation to that illustrated in the Japanese Unexamined Patent Publication No. 131,151/1982 and which produces a carrier control signal $CO_1$ in the manner described in the above-mentioned reference. The carrier control signal $CO_1$ may be called a normal phase control signal, as will become clear as the description proceeds.

In FIG. 1, the first through fifth bits $D_{1p}$ to $D_{5p}$ and $D_{1q}$ to $D_{5q}$ are sent to a read-only memory (ROM) 35 which may serve to carry out a logic operation as will presently become clear.

Figure 2:
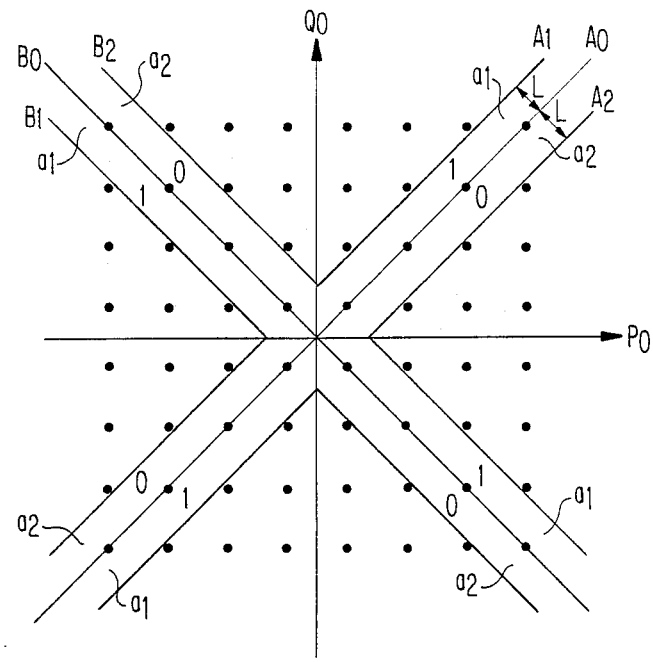
FIG. 2 shows a phase plane for use in describing an operation of a demodulator included in the demodulation system illustrated in FIG. 1.
Figure 3:
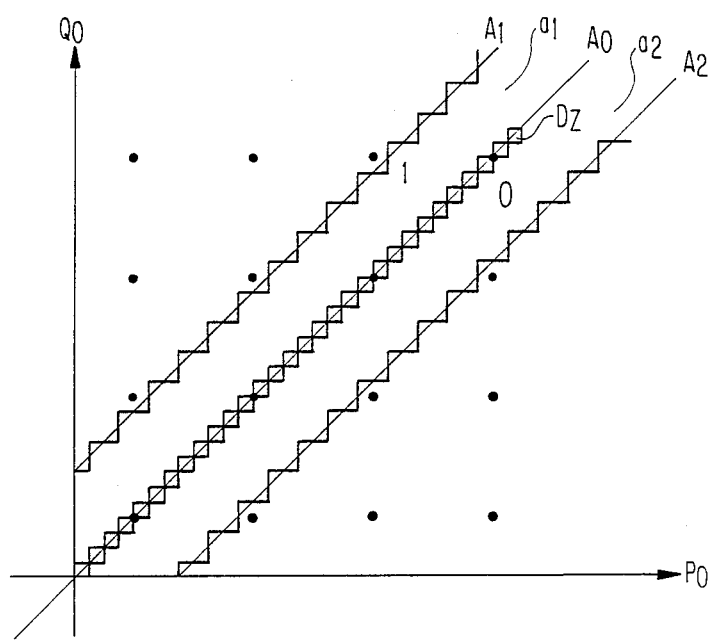
FIG. 3 shows an enlarged view of a part of the phase plane illustrated in FIG. 2.

Referring to FIGS. 2 and 3 together with FIG. 1, the phase plane of the modulated signal MD is illustrated to describe the logic operation of the read-only memory 35. As shown in FIG. 2, the modulated signal MD has the signal points, sixty-four in number, on the phase plane. The phase plane is divided into the quadrants by the quadrant reference axes which ar depicted at $P_0$ and $Q_0$ and defined by the first bits $D_{1p}$ and $D_{1q}$ of the first and the second intermediate digital signal sets. In the example being illustrated, eight of the signal points are arranged near each of the quadrant reference axes $P_0$ and $Q_0$ with an equidistant spacing left therebetween.

In accordance with this invention, the illustrated phase plane is divided by a pair of auxiliary reference axes $A_0$ and $B_0$ which are phase shifted by $\pi/4$ (radians) relative to the quadrant reference axes $P_0$ and $Q_0$. As a result, the phase plane is divided into eight areas by the quadrant and the auxiliary reference axes $P_0$, $Q_0$, $A_0$, and $B_0$.

A plurality of zones are defined along and adjacent to the auxiliary reference axes $A_0$ and $B_0$ on both sides of the auxiliary axis extended in each quadrant. Consequently, the zones in each quadrant is divided into a counterclockwise zone $a_1$ and a clockwise zone $a_2$. In other words, it may be said that the counterclockwise zone $a_1$ of the first quadrant is defined between the auxiliary reference axis $A_0$ and a first additional axis $A_1$ spaced apart from the auxiliary reference axis $A_0$ by a distance L while the clockwise zone $a_2$ of the first quadrant is defined between the auxiliary reference axis $A_0$ and a second additional axis $A_2$ symmetrical with the first additional axis $A_1$ relative to the auxiliary reference axis $A_0$. Likewise, the counterclockwise and the clockwise zones $a_1$ and $a_2$ of the second quadrant are defined between the auxiliary reference axis $B_0$ and a third additional axis $B_1$ and between the auxiliary reference axis $B_0$ and a fourth additional axis $B_2$, respectively.

In FIG. 3, the auxiliary reference axis $A_0$ and the first and the second additional axes $A_1$ and $A_2$ are approximated in the first quadrant by five bits of each of the first-set and the second-set intermediate digital signals sent from the first and the second analog-to-digital converters 26 and 27. Thus, the auxiliary axis $A_0$ and the first and the second additional axes $A_1$ and $A_2$ are approximately represented by stepwise lines which are monotonously varied along the auxiliary axis $A_0$ and the first and the second additional axes $A_1$ and $A_2$. When the auxiliary axis $A_0$ is approximated by such a stepwise line, a sequence of dead zones DZ is formed along the auxiliary axis $A_0$ as shown in FIG. 3. In order to reduce the dead zones DZ, the bit number of each intermediate digital signal may be increased. Practically, it has been confirmed that each axis may be approximated by adding two or three bits to the bit number of each output digital signal set $O_p$ or $O_q$.

In FIGS. 1 and 2, the read-only memory 35 detects whether a signal point specified by the first-set and the second-set intermediate digital signals is located on a counterclockwise or a clockwise side relative to the auxiliary axis $A_0$ or $B_0$ in each quadrant and whether or not the signal point in question falls in either of the counterclockwise and the clockwise zones $a_1$ and $a_2$. For this purpose, the read-only memory 35 produces a first detection signal $S_1$ representative of whether the signal point is present on the counterclockwise or the clockwise side. Furthermore, a second detection signal $S_2$ is produced by the read-only memory 35 to represent whether or not the signal point falls in either of the zones $a_1$ and $a_2$.

More particularly, the first detection signal $S_1$ takes a logic "1" level when the signal point is present on the counterclockwise side and, otherwise, takes a logic "0" level as indicated in FIGS. 2 and 3 by 1 and 0. The second detection signal $S_2$ takes the logic "1" level if the signal point belongs to the zones $a_1$ and $a_2$ and, otherwise, takes the logic "0" level.

Consideration will be given to the first detection signal $S_1$. When the signal points are rotated from the illustrated positions clockwise relative to the quadrant reference axes $P_0$ and $Q_0$ and the auxiliary reference axes $A_0$ and $B_0$, the first detection signal $S_1$ takes the logic "1" level. On the other hand, the first detection signal $S_1$ takes the logic "0" level on a counterclockwise rotation of the signal points. This means that the first detection signal $S_1$ is representative of a phase error resulting from rotation of the signal points and therefore serves as a phase error signal. In other words, the first detection signal $S_1$ is never adversely affected by the in-phase interference and a variation of the amplitude of the modulated signal MD. Anyway, the first detection signal $S_1$ is produced in dependency only upon a direction of rotation.

However, the first detection signal $S_1$ must be detected only from the signal points arranged either on the auxiliary reference axes $A_0$ and $B_0$ or in the proximity of the auxiliary reference axes $A_0$ and $B_0$. This is because only noises are derived from the signal points remote from the auxiliary reference axes $A_0$ and $B_0$ and no phase error signal is produced therefrom.

Under the circumstances, it is preferable that any information is not derived from the signal points remote from the auxiliary reference axes $A_0$ and $B_0$. The first through the fourth additional axes $A_1$ to $B_2$ are extended on the phase plane so as to define the zones $a_1$ and $a_2$ and to obviate any information except for the zones $a_1$ and $a_2$ by the use of the second detection signal $S_2$.

From this fact, it is readily understood that the counterclockwise and the clockwise zones $a_1$ and $a_2$ must be determined so that only the signal points on the auxiliary reference axes $A_0$ and $B_0$ are included in the counterclockwise and the clockwise zones $a_1$ and $a_2$.

Referring more particularly to FIG. 1, the first detection signal $S_1$ is delivered to a type D flip-flop 38 on one hand and to the transversal equalizer 21 on the other hand. The second detection signal $S_2$ is delivered to the type D flip-flop 38 through an AND gate 39 enabled by a sequence of clock pulses CLK and also to the transversal equalizer 21. With this structure, the first detection signal $S_1$ is sent to a switch circuit 41 as a specific phase error signal in synchronism with the clock pulse sequence CLK only when the second detection signal $S_2$ takes the logic "1" level. Thus, the first detection signal $S_1$ is given to the switch circuit 41 as the specific phase error signal when each signal point falls within either of the counterclockwise and the clockwise zones $a_1$ and $a_2$.

The switch circuit 41 is supplied with the carrier control signal, normal phase control signal $CO_1$ from the logic circuit 33 and controlled by a switch control signal CONT supplied through an OR gate 43. It may be mentioned here that the carrier control signal $CO_1$ is variable in dependency upon the amplitude of the modulated signal MD. Therefore, the reference carrier signal CA is adversely affected by variation of the amplitude of the modulated signal MD or by the in-phase interference when the reference carrier signal CA is controlled only by the carrier control signal $CO_1$.

Such variation of the amplitude of the modulated signal MD often occurs when the first and the second automatic gain controllers 31 and 32 are put into transient states which are different from normal states. Under the circumstances, the switch circuit 41 selects either one of the specific phase error signal and the carrier control signal $CO_1$ in cooperation with the first and the second automatic gain controllers 31 and 32.

In any event, either the specific phase control signal or the carrier control signal $CO_1$ is selectively supplied through a low-pass filter 44 to a voltage-controlled oscillator 45 as a phase control signal PC. Responsive to the phase control signal PC, the voltage-controlled oscillator 45 controls the reference carrier signal CA to establish synchronization with a carrier wave which is included in the modulated signal in the manner known in the art.

In the example being illustrated, the phase control signal PC is also delivered to an asynchronous state detector (DET) 47 which is for use in detecting the transient states, in particular, an asynchronous state of the demodulator 22. On detection of the asynchronous state, the asynchronous state detector 47 supplies an alarm signal ALM of the logic "1" level to the OR gate 43.

The OR gate 43 is also supplied with first and second alarm signals $ALM_1$ and $ALM_2$ from the first and the second automatic gain controllers 31 and 32, respectively. Each of the first and the second alarm signals $ALM_1$ and $ALM_2$ takes the logic "1" level when each automatic gain controller 31 and 32 is put into the transient state, namely, the automatic gain control is insufficient.

Figure 4:
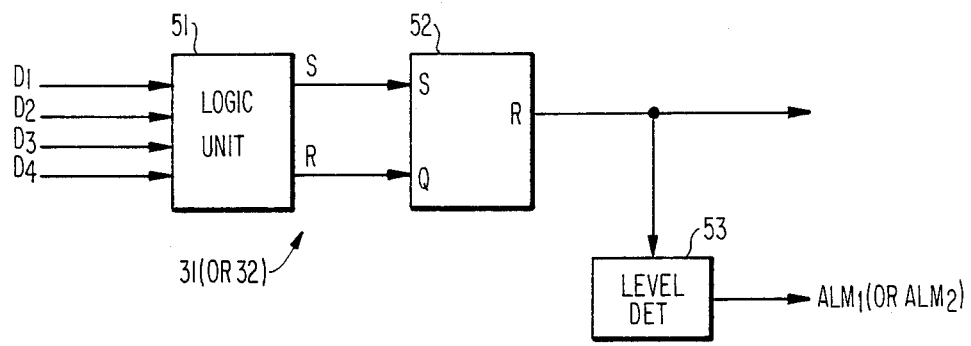
FIG. 4 shows a block diagram of an automatic gain control circuit for use in the demodulation system illustrated in FIG. 1.
Figure 5:
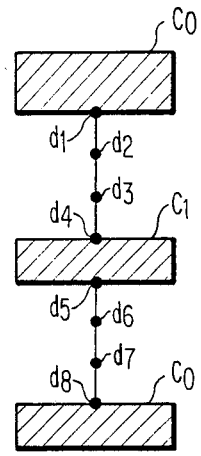
FIG. 5 shows a view for use in describing an operation of the automatic gain control circuit illustrated in FIG. 4.

Referring to FIGS. 4 and 5 afresh and FIG. 1 again, each of the first and the second automatic gain controllers 31 and 32 comprises a logic unit 51 responsive to the first through fourth bits of each of the first-set and the second-set intermediate digital signals $D_1$ to $D_4$ (suffixes p and q omitted). The logic unit 51 carries out a logical operation of detecting eight signal points $d_1$ through $d_8$ arranged along each of the quadrant reference axes $P_0$ and $Q_0$ (FIG. 2). In the transient state, each automatic gain controller 31 or 32 is supplied as each of the first-set and the second-set intermediate digital signals with either an extremely low level signal or an extremely high level signal. Accordingly, the logic unit 51 produces a set signal S of the logic "1" level when each set of the intermediate digital signals is indicative of a pair of areas $C_0$ situated outside of an uppermost one $d_1$ and a lowermost one $d_8$ of the signal points. The logic unit 51 produces a reset signal R of the logic "1" level when each set of the intermediate digital signals is indicative of an area $C_1$ between two inside ones $d_4$ and $d_5$ of the signal points, both exclusive.

The set signal S or the reset signal R is sent to a flip-flop 52 to be delivered as an attenuation control signal to each of the attenuators 24 and 25. Each attenuator 24 or 25 is operated to keep each amplitude of the analog demodulated signals at an optimum level. In the transient state, the flip-flop 52 produces the attenuation control signal of a d.c. level because each set of the intermediate digital signals continuously falls within one of the areas $C_0$ and $C_1$. On the other hand, the flip-flop 52 produces the attenuation control signal which has a mark-to-space ratio equal to ($\frac{1}{2}$) in the normal state.

A level detector 53 monitors the attenuation control signal to produce the first or the second alarm signal $ALM_1$ or $ALM_2$ on detection of the transient state. Such production of the alarm signal $ALM_1$ or $ALM_2$ is possible by calculating a difference between d.c. levels in the transient and the normal states.

In FIG. 1, the first and the second alarm signals $ALM_1$ and $ALM_2$ are sent through the OR gate 43 together with the alarm signal ALM as the switch control signal CONT. When the switch control signal CONT takes the logic "1" level in response to the logic "1" level of at least one of the alarm signals ALM, $ALM_1$, and $ALM_2$, the switch circuit 41 selects the specific phase control signal which is sent to the voltage-controlled oscillator 45 through the low-pass filter 44 as the phase control signal PC.

Thus, the first selection signal $S_1$ is delivered to the voltage-controlled oscillator 45 as the phase control signal PC in the transient state. As mentioned before, the first detection signal $S_1$ is independent from the amplitude of the modulated signal MD. Synchronization is therefore favorably established by the use of the first detection signal $S_1$.

However, the first detection signal $S_1$ is produced with reference to a part of the signal points arranged on the phase plane. This gives rise to a slight increase of jitter components included in the reference carrier signal CA in comparison with the carrier control signal $CO_1$ which are produced with reference to a whole of the signal points. Accordingly, it is preferable that the carrier control signal $CO_1$ is used to control the reference carrier signal CA once synchronization is established. Taking this into consideration, the first detection signal $S_1$ is changed to the carrier control signal $CO_1$ by the switch circuit 41 after extinction of all of the alarm signals ALM, $ALM_1$, and $ALM_2$, namely, establishment of synchronization. Such change from the first detection signal $S_1$ to the carrier control signal $CO_1$ becomes more effective as the number of the signal points increases.

In FIG. 2, it is possible to decrease the jitter components of the reference carrier wave as the distance L becomes short. However, a false pull-in phenomenon often takes place at positions rotated relative to the state illustrated in FIG. 2 when the distance L becomes too short. In view of the false pull-in phenomenon, the distance L is preferably long. Under the circumstances, the counterclockwise and the clockwise zones $a_1$ and $a_2$ are expanded towards ones of the signal points adjacent to the signal points aligned on the auxiliary reference axes $A_0$ and $B_0$.

In the demodulator 22, the circuit elements except the phase detector 23 will collectively be referred to as a decoder 54 for decoding the first and the second analog demodulated signals P and Q into the first-set and the second-set output digital signals $O_p$ and $O_q$. In addition, a combination of the read-only memory 35, the type D flip-flop 38, and the AND gate 39 may be named a logical operation circuit for producing the specific phase control signal in response to the first-set and the second-set intermediate digital signals. The switch circuit 41 and the low-pass filter 44 serve to supply either the specific phase control signal or the normal phase control signal (namely, the carrier control signal) $CO_1$ to the voltage-controlled oscillator 45 and is referred to as a signal supply circuit.

Further referring to FIG. 1, the first and the second detection signals $S_1$ and $S_2$ are fed to the transversal equalizer 21 together with the switch control signal CONT. The transversal equalizer 21 is also supplied with the first bits $D_{1p}$ and $D_{1q}$ and the fourth bits $D_{4p}$ and $D_{4q}$ of the first-set and the second-set intermediate digital signals to equalize the system input signal IN into the equalized signal, namely, the modulated signal MD. The first bits $D_{1p}$ and $D_1$ may be referred to as the quadrant decision signals while the fourth bits $D_{4p}$ and $D_{4q}$ may be called the error signals $E_p$ and $E_q$. As mentioned before, the system input signal IN is subjected to the quadrature amplitude modulation and has a real component and an imaginary component. The illustrated system input signal IN is assumed to belong to an intermediate frequency (IF) band.

The transversal equalizer 21 comprises a transversal filter 55 operable within the intermediate frequency band. As known in the art, the transversal filter 55 comprises a plurality of delay units for delaying the system input signal IN and a plurality of taps on both sides of each delay unit. In the example being illustrated, the delay units are equal in number to four and the taps are therefore five in number. The five taps are successively numbered from $-2$ to $+2$ with a central tap assigned with 0. The taps are controlled by complex weighting control signals which are divided into real part weighting control signals $R_{+2}$, $R_{+1}$, $R_{-1}$, and $R_{-2}$ and imaginary part weighting control signals $I_{+2}$, $I_{+1}$, $I_0$, $I_{-1}$, and $I_{-2}$. The real part weighting control signals $R_{\pm 2}$ and $R_{\pm 1}$ are supplied to the transversal filter 55 from a first weighting control circuit 56 while the imaginary part complex weighting control signals $I_{\pm 2}$, $I_{\pm 1}$, and $I_0$ are supplied from a second weighting control circuit 57. The imaginary part control signal $I_0$ may not be used in the transversal filter 55 but can be used for a different purpose in the demodulator 22. Therefore, the imaginary part control signal $I_0$ will later be depicted.

The first weighting control circuit 56 is given the quadrant decision signals $D_{1p}$ and $D_{1q}$ and the error signals $E_p$ and $E_q$ to produce the real part weighting control signals $R_{\pm 2}$, $R_{\pm 1}$ in the well-known manner.

On the other hand, the second weighting control circuit 57 is operated in response to the first and the second detection signals $S_1$ and $S_2$, the quadrant decision signals $D_{1p}$ and $D_{1q}$, and the switch control signal CONT.

Figure 6:
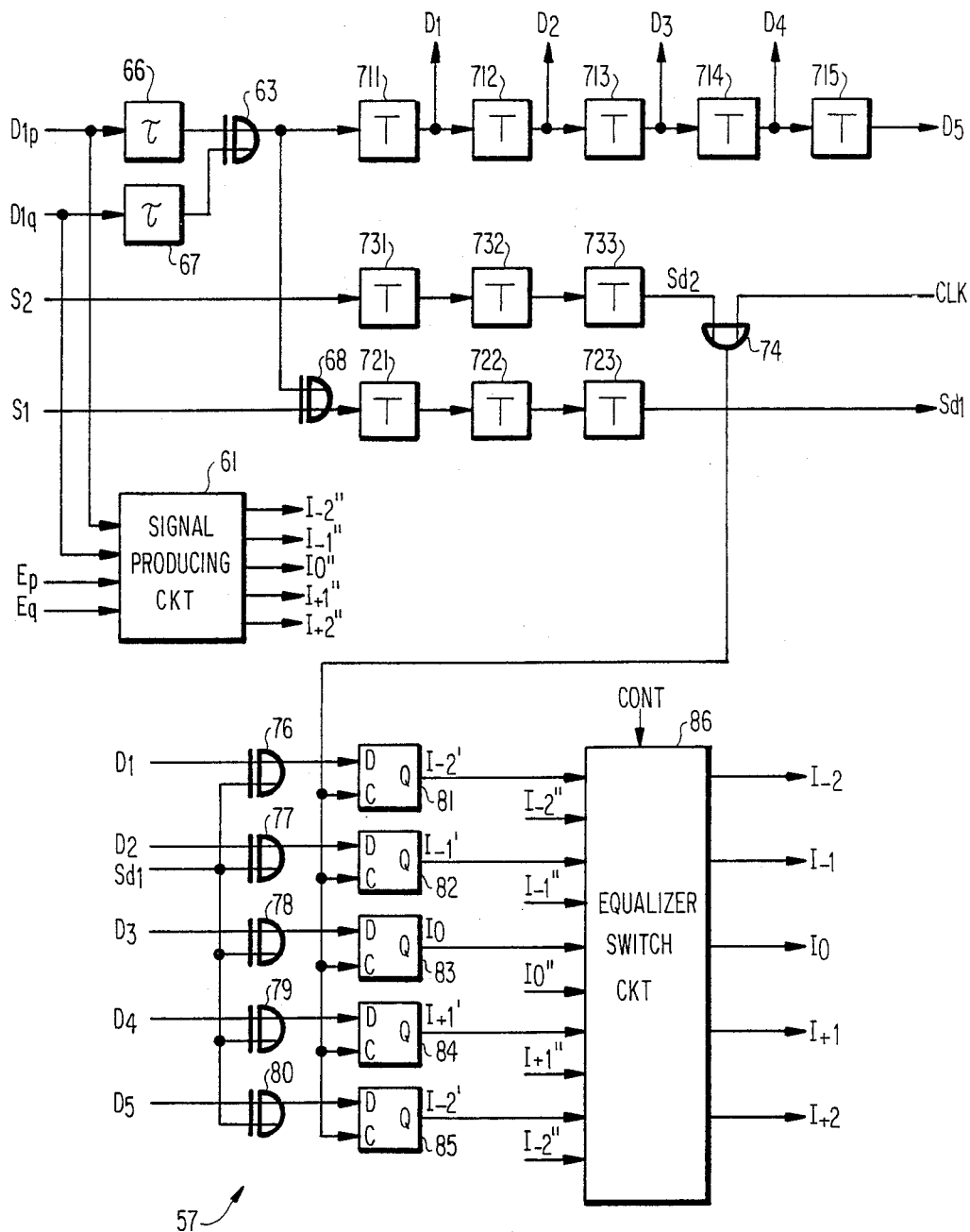
FIG. 6 shows a block diagram of a part of a transversal equalizer used in the demodulation system illustrated in FIG. 1.

Referring to FIG. 6, the second weighting control circuit 57 comprises a signal producing circuit 61 responsive to the quadrant decision signals ($D_{1p}$ and $D_{1q}$) and the error signals ($E_p$ and $E_q$) for producing five local weighting control signals in the known manner. The weighting control signals are depicted at $I_{-2}''$, $I_{-1}''$, $I_0''$, $I_{+1}''$, and $I_{+2}''$ and will be called normal weighting control signals because they become available in the normal state of the demodulator 22 as will become clear as the description proceeds.

The second weighting control circuit 57 comprises a signal processing circuit operable in response to the quadrant decision signals ($D_{1p}$ and $D_{1q}$) and the first and the second detection signals $S_1$ and $S_2$, which are all sent from the demodulator 22. The quadrant decision signals $D_{1p}$ and $D_{1q}$ are delivered to an Exclusive OR gate 63 through first and second preliminary delay units 66 and 67 for compensating for a delay time in the read-only memory 35 (FIG. 1). An output signal of the Exclusive OR gate 63 is sent to an Exclusive OR gate 68 as a quadrant signal concerned with each quadrant on one hand and to five delay units 711 to 715 connected in series to one another on the other hand. Each delay unit 711 to 715 has a delay equal to a time slot determined for each bit. As a result, the output signal of the Exclusive OR gate 63 is successively delayed by the delay units 711 through 715 and produced as first through fifth delayed quadrant signals $D_1$ to $D_5$ from the delay units 711 to 715, respectively.

The first detection signal $S_1$ is given to the Exclusive OR gate 68 in addition to the output signal of the Exclusive OR gate 63 to remove a correlation between the first detection signal $S_1$ and the quadrant decision signals $D_{1p}$ and $D_{1q}$ and to be sent to three delay units 721, 722, and 723 connected in series. The Exclusive OR gate 68 may be omitted, if the correlation between the first detection signal $S_1$ and the quadrant decision signals $D_{1p}$ and $D_{1q}$ is previously removed on the logical operation carried out in the read-only memory 35. Anyway, the first detection signal $S_1$ is successively delayed by the delay unit series 721 to 723 to be produced as a first delayed detection signal $Sd_1$.

In addition, the second detection signal $S_2$ is also delayed for three time slots by a series of delay units 731 to 733 to be sent to an AND gate 74 as a second delayed detection signal $Sd_2$ after a delay of three time slots. The second delayed detection signal $Sd_2$ is produced in synchronism with the clock pulses CLK.

The first through fifth delayed quadrant signals $D_1$ to $D_5$ are made to correspond to the five taps of the transversal filter 55, respectively, and supplied to first through fifth Exclusive OR circuits 76 to 80 together with the first delayed detection signal $Sd_1$ indicative of either one of the counterclockwise and the clockwise zones $a_1$ and $a_2$. First through fifth result signals are sent from the first through fifth Exclusive OR circuits 76 through 80 to first through fifth type D flip-flops 81 to 85 and set into the first through fifth type D flip-flops 81 to 85 when the second delayed detection signal $Sd_2$ takes the logic "1" level on production of the clock pulses CLK. Consequently, the first through fifth D type flip-flops 81 to 85 delivers first through fifth flip-flop signals $I_{-2}'$, $I_{-1}'$, $I_0'$, $I_{+1}'$, and $I_{+2}'$ to an equalizer switch unit 86 when the second delayed control signal $Sd_2$ takes the logic "1" level, namely, when the signal points fall within specific zones, such as $a_1$ and $a_2$ (FIG. 2). The first through fifth flip-flop signals $I_{-2}'$ to $I_{+2}'$ may be called first through fifth specific weighting control signals, respectively, because they are produced only when the signal points fall within the specific zones.

The equalizer switch unit 86 selects either of the normal weighting control signals $I_{-2}''$ to $I_{+2}''$ and the specific weighting control signals $I_{-2}'$ to $I_{+2}'$ in response to the switch control signal CONT given from the demodulator 22 (FIG. 1). More particularly, the specific weighting control signals $I_{-2}'$ to $I_{+2}'$ are selected by the equalizer switch circuit 86 while the switch control signal CONT takes the logic "1" level in the transient state. Otherwise, the normal weighting control signal $I_{-2}''$ to $I_{+2}''$ are selected in the normal state by the equalizer switch circuit 86. Thus, the equalizer switch circuit 86 supplies the transversal filter 55 with either the normal weighting control signals $I_{-2}''$ to $I_{+2}''$ or the specific weighting control signals $I_{-2}'$ to $I_{+2}'$ as the imaginary part weighting control signals $I_{-2}$ to $I_{+2}$.

The specific weighting control signals $I_{-2}'$ to $I_{+2}'$ are produced in response to the first detection signal $S_1$ influenced by neither the in-phase interference nor variation of the amplitude of the modulated signal MD. Accordingly, it is possible to make the imaginary part weighting control signals $I_{\pm 2}$, $I_{\pm 1}$, and $I_0$, namely, the specific weighting control signals $I_{-2}''$ to $I_{+2}''$ converge independently of the real part weighting control signals $R_{\pm 2}$ and $R_{\pm 1}$, even when the system input signal IN is subjected to the in-phase interference and cross-interference. This enables quick convergence when the demodulation system is put into the asynchronous state. Moreover, the synchronous state is kept stable even when an amount of the interferences increases. In other words, it is possible to increase that amount of the interferences which makes the convergence impossible.

It is to be noted here that the imaginary part control signal $I_0$ is equivalent to the output signal of the switch unit 41 illustrated in FIG. 1 because a combination of the Exclusive OR circuit 78, the type D flip-flop 83, and the equalizer switch circuit 86, and the AND gate 74 (FIG. 6) is similar in operation to a combination of the type D flip-flop 38, the switch circuit 41, and the AND gate 39 (FIG. 1). Therefore, the voltage-controlled oscillator 45 may be controlled by the imaginary part control signal $I_0$ In this case, a synchronization loop of the demodulator 22 is formed through the second weighting control circuit 57.

Inasmuch as a combination of the attenuator 24 (or 25) and the automatic gain controller 31 (or 32) serves as a part of the first weighting control circuit 56 for controlling the central tap of the transversal filter 55 (FIG. 1), no real part weighting control signal $R_0$ for the central tap is illustrated in FIG. 1.

Figure 7:
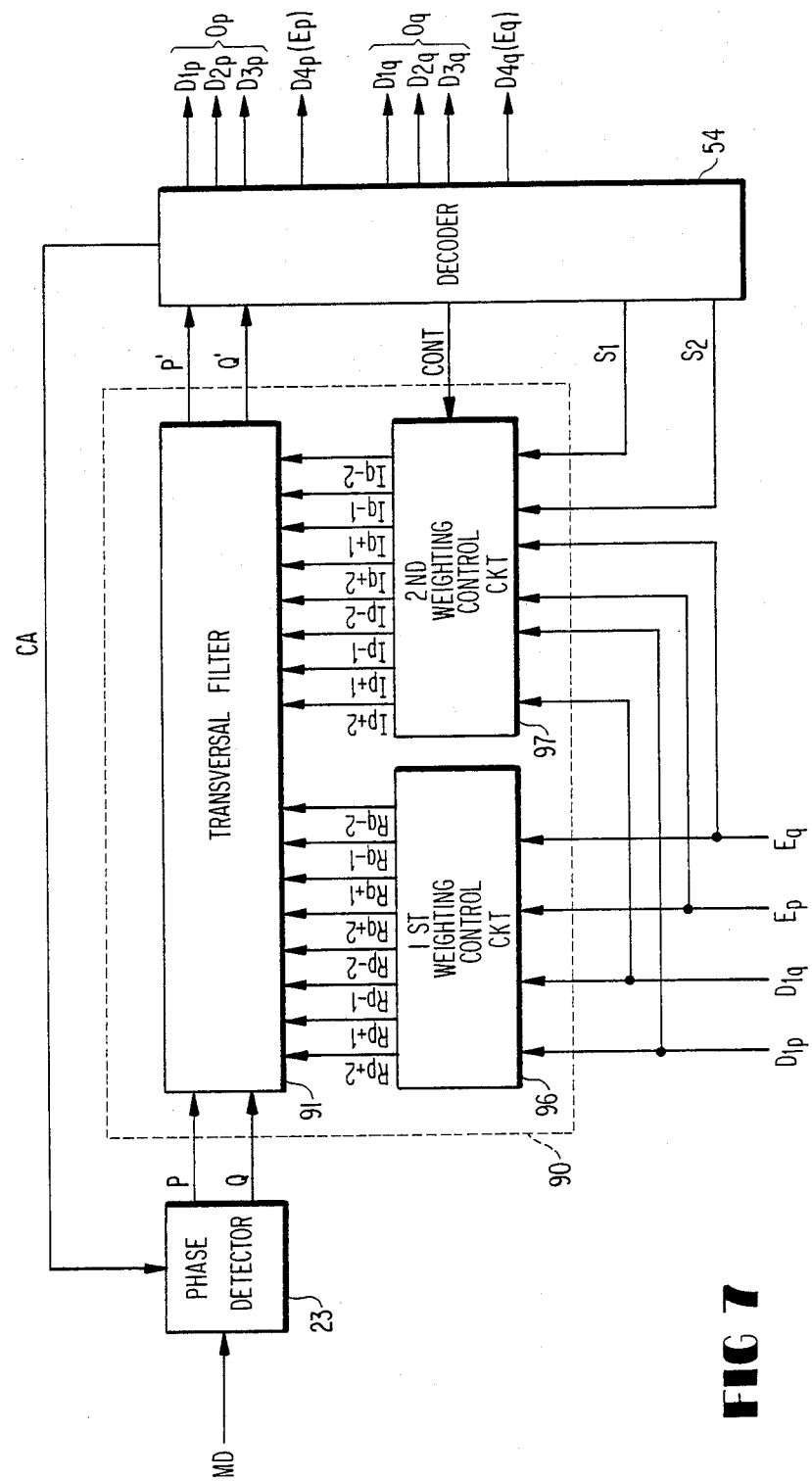
FIG. 7 shows a block diagram of a demodulation system according to a second embodiment of this invention.

Referring to FIG. 7, a demodulation system according to a second embodiment of this invention comprises similar parts designated by like reference numerals and symbols. In FIG. 7, it is to be noted that a transversal equalizer 90 is operable in a baseband and is located between the phase detector 23 and the decoder 54. The transversal equalizer 90 is for equalizing the first and the second analog demodulated signals P and Q into first and second equalized signals P' and Q', respectively.

The illustrated decoder 54 is similar in operation and structure to that of FIG. 1 except that the first and the second equalized signals P' and Q' are converted into the first-set and the second-set intermediate digital signals by a converting circuit, such as the analog-to-digital converters 26 and 27. In any event, the first and the second detection signals $S_1$ and $S_2$ are produced by the use of the read-only memory 35 in the manner mentioned in conjunction with FIG. 1. The switch control signal CONT is also produced in the manner described before. The first through third bits $D_{1p}$ to $D_{3p}$ and $D_{1q}$ to $D_{3q}$ of the first-set and the second-set intermediate digital signals appear as the first-set and the second-set output digital signals $O_p$ and $O_q$, respectively, while the first bits $D_{1p}$ and $D_{1q}$ and the fourth bits $D_{4p}$ and $D_{4q}$ are sent as the quadrant decision signals and the error signals $E_p$ and $E_q$ to the transversal equalizer 90, respectively.

In FIG. 7, the transversal equalizer 90 comprises a transversal filter 91 for individually equalizing the first and the second analog demodulated signals P and Q which carry components of a P-channel and a Q-channel, respectively. Thus, the transversal filter 91 has a P-channel portion (not shown) for the first analog demodulated signal P and a Q-channel portion (not shown also) for the second analog demodulated signal. Each of the P-channel and Q-channel portions has four delay units and five taps controlled by complex weighting control signals.

The complex weighting control signals are divided into real part weighting control signals and imaginary part weighting control signals. The real part weighting control signals are given to the P- and Q-channel portions and are therefore divided into first real part control signals $R_{p+2}$, $R_{p+1}$, $R_{p-1}$, and $R_{p-2}$ and second real part control signals $R_{q+2}$, $R_{q+1}$, $R_{q-1}$, and $R_{q-2}$ for the P- and the Q-channels, respectively. Likewise, the imaginary part weighting control signals are divided into first imaginary part control signals $I_{p+2}$, $I_{p+1}$, $I_{p0}$, $I_{p-1}$, and $I_{p-2}$ and second imaginary part control signals $I_{q+2}$, $I_{q+1}$, $I_{q0}$, $I_{q-1}$, and $I_{q-2}$ for the P- and the Q-channels, respectively, although $I_{p0}$ and $I_{q0}$ are not depicted in FIG. 7, as is the case with FIG. 1.

Inasmuch as such a transversal filter 90 is known in the art, description will not be described about the transversal filter any longer.

Like in FIG. 1, the transversal equalizer 90 comprises first and second weighting control circuits (depicted at 96 and 97) which are operable in response to the quadrant decision signals $D_{1p}$ and $D_{1q}$ and the error signals $E_p$ and $E_q$. The first weighting control circuit 96 delivers the first real part control signals $R_{p+2}$ through $R_{p-2}$ to the taps of the P-channel portion and also delivers the second real part control signals $R_{q+2}$ through $R_{q-2}$ to the taps of the Q-channel portion in the known manner.

The second weighting control circuit 97 is further supplied with the switch control signal CONT and the first and the second detection signals $S_1$ and $S_2$.

Figure 8:
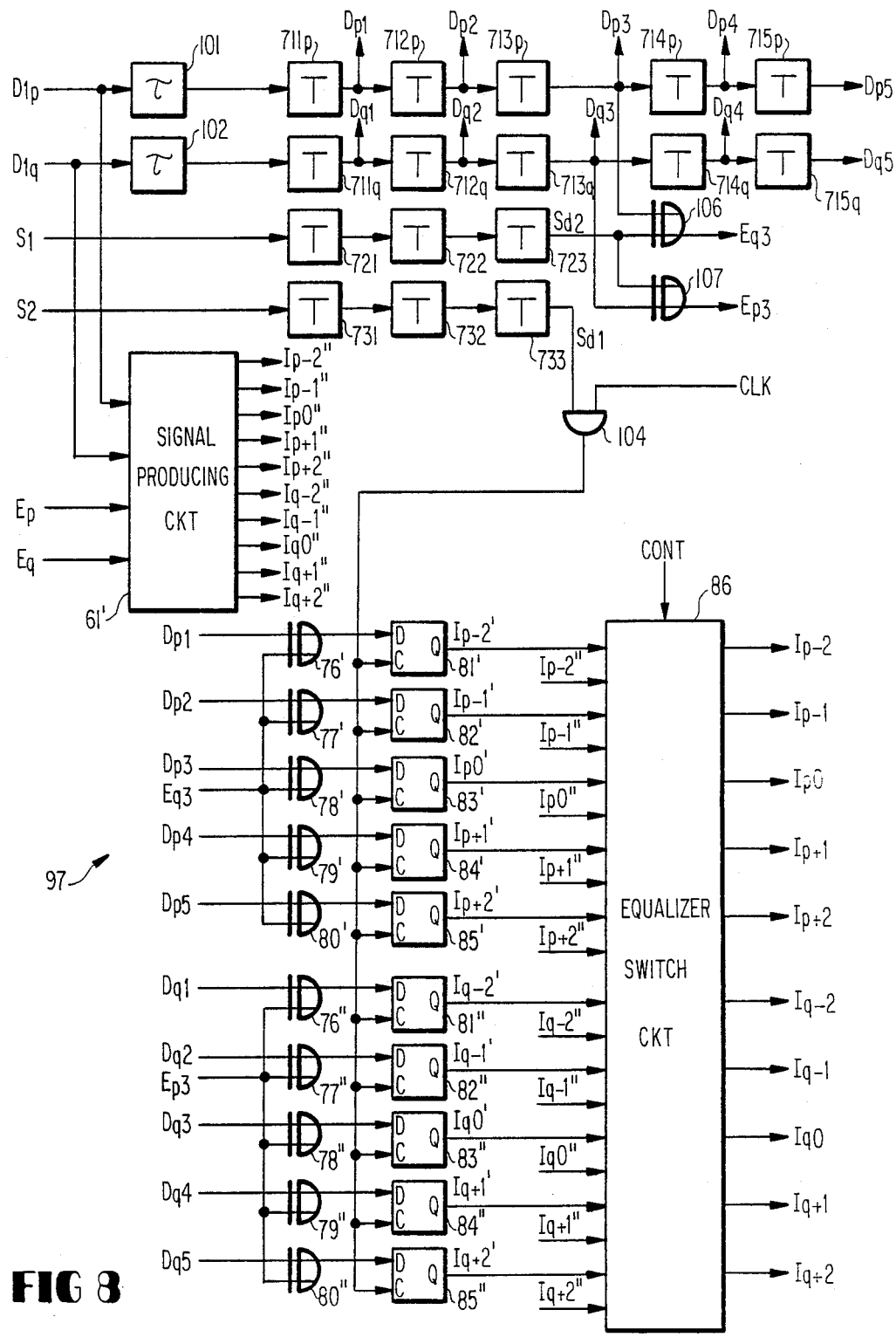
FIG. 8 shows a block diagram of a part of a transversal filter for use in the demodulation system illustrated in FIG. 7.

Referring to FIG. 8 together with FIG. 7, the second weighting control circuit 97 comprises a signal producing circuit 61' responsive to the quadrant decision signals $D_{1p}$ and $D_{1q}$ and the error signals $E_p$ and $E_q$. The signal producing circuit 61' produces imaginary part weighting control signals as normal imaginary part control signals $I_{p-2}''$ through $I_{p+2}''$ and $I_{q-2}''$ through $I_{q+2}''$ in the known manner. Both of $I_{p0}''$ and $I_{q0}''$ can be illustrated for the same purpose as $I_0''$ of FIG. 6, although they are not used in the transversal equalizer 91.

The second weighting control circuit 97 further comprises a signal processing circuit operable in response to the first and the second detection signals $S_1$ and $S_2$ and to the quadrant decision signals $D_{1p}$ and $D_{1q}$ which will be named a P-channel signal and a Q-channel signal, respectively. The P-channel signal $D_{1p}$ is supplied through a first preliminary delay unit 101 to a set of five delay units 711p to 715p connected in series. Consequently, the P-channel signal $D_{1p}$ is successively delayed by the delay units 711p to 715p to be produced as first through fifth delayed P-channel signals $D_{p1}$ to $D_{p5}$, respectively.

Likewise, the Q-channel signal $D_{1q}$ is sent through a second preliminary delay unit 102 to another set of delay units 711q to 715q to be produced as first through fifth Q-channel signals $D_{q1}$ to $D_{q5}$.

The second detection signal $S_2$ is delayed through three delay units 731 to 733 and is sent as a second delayed detection signal $Sd_2$ to an AND gate 104. The first detection signal $S_1$ is sent as a first delayed detection signal $Sd_1$ to a pair of Exclusive OR gates 106 and 107 through three delay units 721 to 723. The Exclusive OR gates 106 and 107 are supplied with the third delayed P-channel signal $D_{p3}$ and the third delayed Q-channel signal $D_{q3}$, respectively. In this event, the Exclusive OR gate 106 produces a first gate output signal $E_{q3}$ of the logic "1" level when the first delayed detection signal $Sd_1$ takes the logic "1" level with the third delayed P-channel signal $D_{p3}$ kept at the logic "0" level and when the first delayed detection signal $Sd_1$ takes the logic "0" level with the third delayed P-channel signal $D_{p3}$ kept at the logic "1" level. Similarly, the Exclusive OR gate 107 produces a second output signal $E_{p3}$ of the logic "1" level in response to the first delayed detection signal $Sd_1$ and the third delayed Q-channel signal $D_{q3}$.

The first through fifth delayed P-channel signals $D_{p1}$ to $D_{p5}$ are delivered to first through fifth Exclusive OR circuits 76' to 80' supplied with the first gate output signal $E_{q3}$ and are set into first through fifth type D flip-flops 81' to 85' in synchronism with the second delayed detection signal $Sd_2$ given through the AND gate 107. As a result, first through fifth flip-flop output signals are sent to the equalizer switch circuit 86 as first through fifth specific P-channel control signals $I_{p-2'}$ to $I_{p+2'}$ for controlling the imaginary parts of the first analog demodulated signal P.

Likewise, the first through fifth delayed Q-channel signals $D_{q1}$ to $D_{q5}$ are supplied to sixth through tenth Exclusive OR gates 76" to 80" together with the second gate output signal $E_{p3}$ in timed relation to the second delayed detection signal $Sd_2$ and set into sixth through tenth type D flip-flops 81" to 85". As a result, first through fifth specific Q-channel control signals $I_{p-2'}$ to $I_{q+2'}$ are sent from the sixth through tenth type D flip-flops 81" to 85" to the equalizer switch circuit 86 to control the imaginary parts of the second analog demodulated signal Q. The first through fifth specific P-channel and Q-channel control signals will collectively be called specific imaginary control signals $I_{p-2'}$ to $I_{p+2'}$ and $I_{q-2'}$ to $I_{q+2'}$.

Responsive to the switch control signal CONT, the equalizer switch circuit 86 selects either one of the normal and the specific imaginary part control signals to produce the imaginary part weighting control signals $I_{p-2}$ to $I_{p+2}$ and $I_{q-2}$ to $I_{q+2}$. Both of $I_{p0}$ and $I_{q0}$ may be used to establish synchronization in the demodulator 22 like in FIG. 6.

Figure 9:
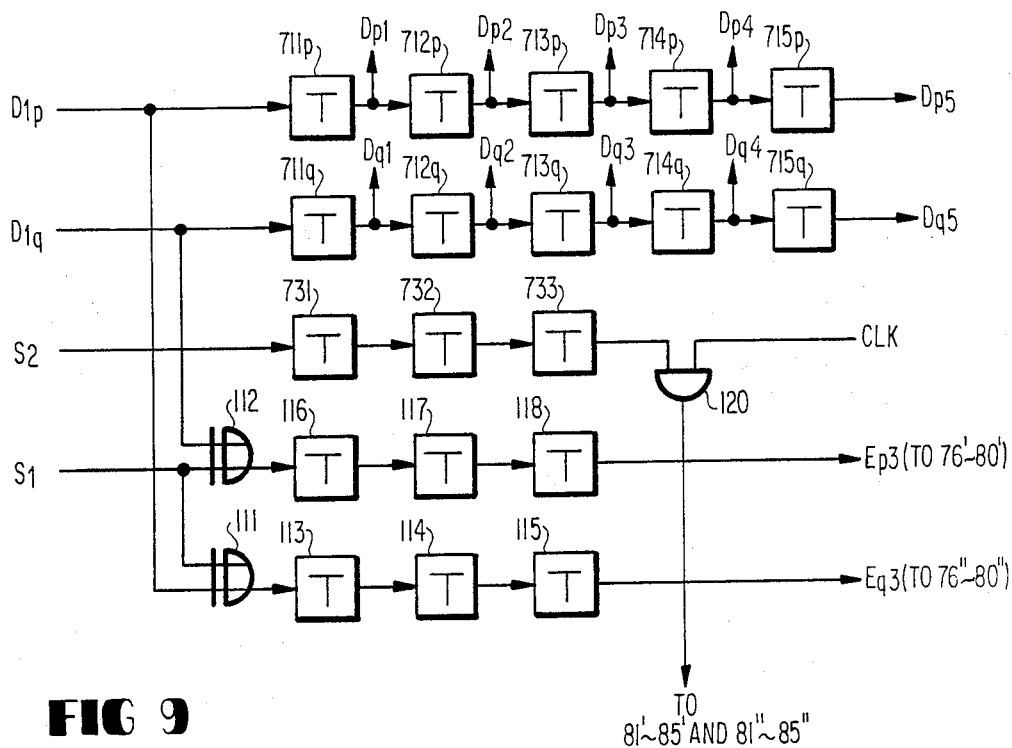
FIG. 9 shows a block diagram of a circuit which can be substituted for a portion of the part illustrated in FIG. 8.

Referring to FIG. 9, a signal processing circuit of the second weighting control circuit 97 is somewhat changed from that illustrated in FIG. 8. More particularly, the first detection signal $S_1$ is at first fed to a pair of Exclusive OR gates 111 and 112 responsive to the P-channel signal $D_{1p}$ and the Q-channel signal $D_{1q}$, respectively, and is thereafter delayed through a first set of three delay units 113 to 115 and through a second of three delay units 116 to 118. The delay units 113 to 115 of the first set produce a first delayed signal equal to the first gate output signal $E_{q3}$ (FIG. 8) and may therefore be represented by $E_{q3}$ while the delay units 116 to 118 of the second set produce a second delayed signal equal to the second gate output signal $E_{p3}$ (FIG. 8) and may be represented by $E_{p3}$. The first and the second delayed signals $E_{q3}$ and $E_{p3}$ are delivered to the first through fifth Exclusive OR circuits 76' through 80' and to the sixth through tenth Exclusive OR circuits 76" to 80", respectively.

On the other hand, the second detection signal $S_2$ is delivered to another set of three delay units 731 to 733 to be successively delayed and to be sent through an AND gate 120 to the frist through tenth type D flip-flops 81' to 85' and 81" to 85".

With this structure, it is possible to carry out an operation similar to that described in conjunction with FIG. 8, as readily understood from FIG. 9.

Figure 10:
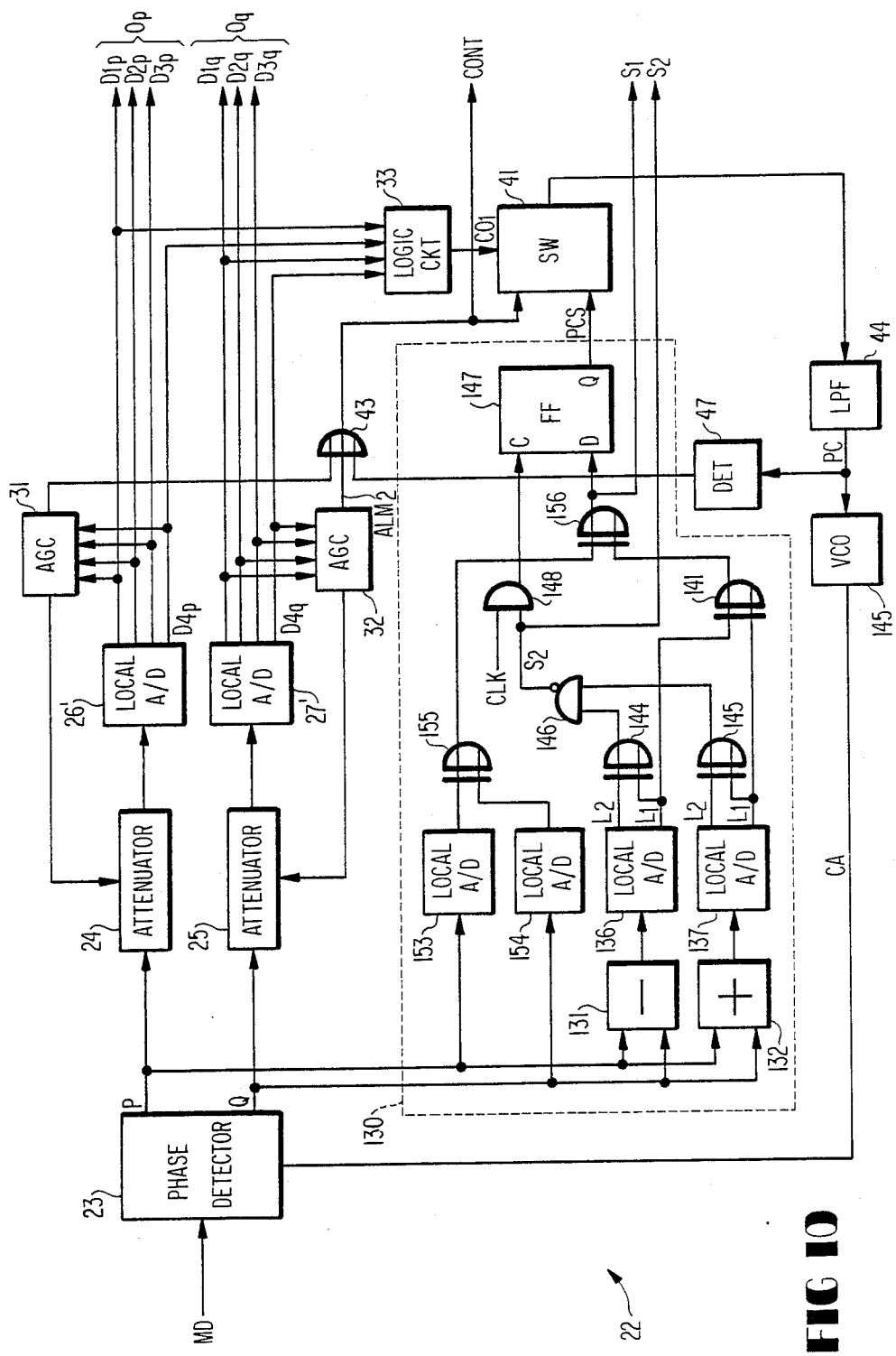
FIG. 10 shows a block diagram of a demodulator for use in a demodulation system according to a third embodiment of this invention.

Referring to FIG. 10, a demodulator 22 is for use in a demodulation system according to a third embodiment of this invention and comprises similar parts and signals designated by like reference numerals and symbols. The illustrated demodulator 22 is supplied with the modulated signal MD and may therefore be coupled to the transversal equalizer 21 operable in the intermediate frequency band. The modulated signal MD is demodulated by the phase detector 23 into the first and the second analog demodulated signals P and Q by the use of the reference carrier signal CA controlled in a manner similar to that described in conjunction with FIG. 1. The first and the second analog demodulated signals P and Q are supplied direct to the variable attenuators 24 and 25, but may be supplied to the variable attenuators 24 and 25 through a transversal equalizer as shown in FIGS. 7 and 8.

In FIG. 10, a logical operation circuit depicted at 130 is included in the demodulator 22 so as to supply the specific phase control signal (depicted at PCS in FIG. 10) to the voltage-controlled oscillator 45 as the phase control signal PC in the transient or asynchronous state of the demodulator 22. It is to be noted here that the illustrated logical operation circuit 130 does not comprise the read-only memory 35 (FIG. 1) accessed by the first through fifth bits $D_{1p}$ to $D_{5p}$ and $D_{1q}$ to $D_{5q}$. In this connection, the first analog demodulated signal P is converted into first through fourth bits $D_{1p}$ to $D_{4p}$ of the first set intermediate digital signal by a first analog-to-digital converter 26'. Similarly, the second analog demodulated signal Q is converted into first through fourth bits $D_{1q}$ to $D_{4q}$ of the second-set intermediate digital signal by a second analog-to-digital converter 27'. The first through third bits $D_{1p}$ to $D_{3p}$ and $D_{1q}$ to $D_{3q}$ are produced as the first-set and the second-set output digital signals, respectively.

In the logical operation circuit 130, the first and the second analog demodulated signals P and Q are delivered to a subtractor 131 and an adder 132. The subtractor 131 carries out subtraction between the first and the second analog demodulated signals P and Q while the adder 132 carries out addition therebetween. Such subtraction and addition bring about phase shifts of the first and the second analog demodulated signals P and Q by $\pi/4$ (radians), respectively. Therefore, the subtractor 131 and the adder 132 produce first and second phase-shifted analog signals which are phase shifted by $\pi/4$ relative to the first and the second analog demodulated signals P and Q, respectively.

The first and the second phase-shifted analog signals are sent to first and second local analog-to-digital (A/D) converters 136 and 137 each of which produces a first result signal $L_1$ representative of whether or not each analog signal is positive. This means that the first and the second local A/D converters 136 and 137 equivalently carry out detection on the auxiliary reference axes $A_0$ and $B_0$ (FIG. 2). Both the first result signals are sent to an Exclusive OR gate 141 to carry out an Exclusive OR operation therebetween. A result of the Exclusive OR is produced through an Exclusive OR gate 156 as the first detection signal $S_1$ specifying the areas concerned with the auxiliary axes $A_0$ and $B_0$ (FIG. 2).

Each of the first and the second local A/D converters 136 and 137 has threshold levels corresponding to the distance $\pm L$ illustrated in FIG. 2 and produces a second result signal $L_2$ representative of a result of comparison of each phase-shifted analog signal with the threshold levels $\pm L$.

The first and the second result signals $L_1$ and $L_2$ of the first local A/D converter 136 are sent to an Exclusive OR circuit 144 while the first and the second result signals $L_1$ and $L_2$ of the second local A/D converter 137, an Exclusive OR circuit 145. Each output signal of the Exclusive OR circuits 144 and 145 takes the logic "0" level only when the signal points fall within the zones $a_1$ and $a_2$ (FIG. 2). Otherwise, it takes the logic "1" level. Supplied with both the output signals of the Exclusive OR circuits 144 and 145, a NAND gate 146 produces the second detection signal $S_2$ which takes the logic "1" level when the signal points are present within the zones $a_1$ and $a_2$. The second detection signal $S_2$ is delivered to the transversal equalizer 21 (FIG. 1) and also to a type D flip-flop 147 through an AND gate 148 in timed relation to the clock pulses CLK.

The first and the second analog demodulated signals P and Q are also supplied with third and fourth local A/D converters 153 and 154 each of which decides whether each analog demodulated signal is representative of either a positive value or a negative one. This implies that output signals of the third and the fourth local A/D converters 153 and 154 are equivalent to the first bits $D_{1p}$ an $D_{1q}$ of the first and the second A/D converters 26' and 27'. Therefore, the first bits $D_{1p}$ and $D_{1q}$ may be used instead of the output signals of the third and the fourth local A/D converters 153 and 154.

In the illustrated example, the output signals of the third and the fourth local A/D converters 153 and 154 are delivered through an Exclusive OR gate 155 to an Exclusive OR gate 156 responsive to the output signal of the Exclusive OR gate 141. An Exclusive OR operation between the output signal of the Exclusive OR gate 141 and an output signal of the Exclusive OR gate 155 results in a phase error signal, namely, the first detection signal $S_1$, which is equivalent to that used in four-phase PSK. The phase error signal is set into the type D flip-flop 147 in timed relation to the second detection signal $S_2$ given through the AND gate 148 and is delivered to the switch circuit 41 as the specific phase control signal PCS. The first detection signal $S_1$ may be sent to the second weighting control circuit 57 illustrated in FIG. 6.

The switch circuit 41 selects either one of the normal and the specific phase control signals in response to the switch control signal CONT in the manner mentioned before.

Figure 11:
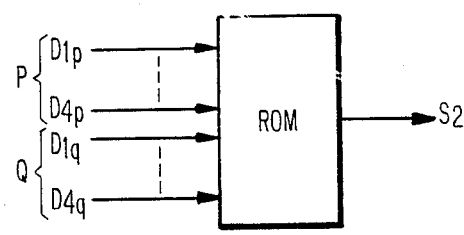
FIG. 11 shows a block diagram of a circuit which can be substituted for a part of the demodulator illustrated in FIG. 10.

Referring to FIG. 11, a circuit which may be called a zone detector can be substituted for a combination of the subtractor 131, the adder 132, the first and the second local A/D converters 136 and 137, the Exclusive OR gates 144 and 145, and the NAND gate 146, which are all illustrated in FIG. 10. The illustrated zone detector comprises a read-only memory 160 responsive to the first-set and the second-set intermediate digital signals $D_{1p}$ to $D_{4p}$ and $D_{1q}$ to $D_{4q}$ supplied from the first and the second A/D converters 26' and 27'. The read-only memory 160 produces the logic "1" level as the second detection signal $S_2$ when the signal points fall within the zones.

While this invention thus far been described in conjunction with a few embodiments thereof, it will readily be possible for those skilled in the art to put this invention into practice in various other manners. For example, this invention is not restricted to 64 QAM but is applicable to 4 QAM, 16 QAM, 256 QAM, and 1024 QAM. In this event, each of the first and the second A/D converters 26 and 27 or 26' and 27' may be changed to produce different numbers of bits of the intermediate digital signals and the read-only memory may have a different bit capacity. In FIG. 10, the output signal of the Exclusive OR gate 141 may be directly supplied to the second weighting control circuit illustrated in FIG. 9 in place of the first detection signal $S_1$.

What is claimed is:

1. A demodulation system for use in demodulating a quadrature amplitude modulated signal into first and second sets of output digital signals, said system comprising detecting means responsive to said modulated signal and a reference carrier wave for detecting a first and a second analog demodulated signal from said modulated signal with reference to said reference carrier wave, converting means coupled to said detecting means for converting said first and said second analog demodulated signals into first and second sets of intermediate digital signals, respectively, output means coupled to said converting means for deriving said first-set and said second-set of output digital signals from said first and said second intermediate digital signals, respectively, and controllable carrier wave generating means responsive to a phase control signal for supplying said detecting means with said reference carrier wave, said modulated signal being specified on a phase plane having a pair of quadrant reference axes, wherein the improvement comprises:

logical operation means responsive to at least one of said first and said second analog demodulated signals and said first-set and said second-set of intermediate digital signals for carrying out a logical operation to produce a specific phase control signal with reference to a plurality of areas and a plurality of zones of said phase plane with said phase plane divided into said areas by said quadrant reference axes and a pair of auxiliary reference axes which are phase shifted by $\pi/4$ (radians) relative to said quadrant reference axes, said zones being defined along and adjacent to said auxiliary reference axes; and signal supply means for selectively supplying said specific phase control signal to said controllable carrier wave generating means as said phase control signal.

2. A demodulation system as claimed in claim 1, said demodulation system being selectively operable in a transient state and a normal state and comprising means coupled to said converting means for producing a normal phase control signal in said normal state, said demodulation system further comprising:

means coupled to said converting means for detecting said transient state to produce an alarm signal representative of said transient state;

said signal supply means selecting said specific phase control signal as said phase control signal when said alarm signal is supplied thereto, and, otherwise, selecting said normal phase control signal as said phase control signal.

3. A demodulation system as claimed in claim 1, wherein said logical operation means comprises:

a read-only memory responsive to said first-set and said second-set of intermediate digital signals for producing a first and a second detection signal concerned with the areas and the zones specified by said first-set and said second-set of intermediate digital signals, respectively; and means responsive to said first and said second detection signals for producing said specific phase control signal.

4. A demodulation system as claimed in claim 1, wherein said logical operation means comprises:

means responsive to said first and said second analog demodulated signals for producing a first and a second detection signal concerned with the areas and the zones specified by said first and said second analog demodulated signals; and means responsive to said first and said second detection signals for supplying said signal supply means with said specific phase control signal.

5. A demodulation system as claimed in claim 4, said demodulation system being selectively operable in a transient state and a normal state and comprising means coupled to said converting means for producing a normal phase control signal in said normal state, said demodulation system further comprising:

means coupled to said converting means for detecting said transient state to produce an alarm signal representative of said transient state;

said signal supply means selecting said specific phase control signal as said phase control signal when said alarm signal is supplied thereto and, otherwise, selecting said normal phase control signal as said phase control signal.

6. A demodulation system as claimed in claim 1, said system further comprising equalizing means responsive to a system input signal subjected to quadrature amplitude modulation for equalizing said system input signal into an equalized signal which is for use as said quadrature amplitude modulated signal, said system input signal comprising a real and an imaginary component, said first-set and said second-set of intermediate digital signals comprising a first pair of digital signals and a second pair of digital signals, respectively, said equalizing means comprising a transversal filter having a plurality of taps controlled by complex weighting control signals, respectively, each of which is divided into real and imaginary part weighting control signals, and a first weighting controller coupled to said converting means for producing said real part weighting control signals in response to said first-pair and said second-pair of digital signals, wherein said equalizing means further comprises:

a second weighting controller coupled to said converting means and said logical operation means for producing said imaginary part weighting control signals in response to said first-pair and said second-pair of digital signals and with reference to both said areas and said zones.

7. A demodulation system for use in demodulating a quadrature amplitude modulated signal into first and second sets of output digital signals, said system comprising detecting means responsive to said modulated signal and a reference carrier wave for detecting a first and a second analog demodulated signal from said modulated signal with reference to said reference carrier wave, equalizing means coupled to said detecting means for equalizing said first and said second analog demodulated signals into a first and a second equalized signal, respectively, converting means coupled to said detecting means for converting said first and said second equalized signals into first and second sets of intermediate digital signals, respectively, output means coupled to said converting means for deriving said first-set and second-set, of output digital signals from said first and said second intermediate digital signals, respectively, and controllable carrier wave generating means responsive to a phase control signal for supplying said detecting means with said reference carrier wave, said modulated signal being specified on a phase plane having a pair of quadrant reference axes, wherein the improvement comprises:

logical operation means responsive to at least one of said first-set and second second-set of intermediate digital signals for carrying out a logical operation to produce a specific phase control signal with reference to a plurality of areas and a plurality of zones of said phase plane with said phase plane divided into said areas by said quadrant reference axes and a pair of auxiliary references axes which are phase shifted by $\pi/4$ (radians) relative to said quadrant reference axes, said zones being defined along and adjacent to said auxiliary reference axes; and signal supply means for selectively supplying said specific phase control signal to said controllable carrier wave generating means as said phase control signal.

8. A demodulation system as claimed in claim 7, said demodulation system being selectively operable in a transient state and a normal state and comprising means coupled to said converting means for producing a normal phase control signal in said normal state, said demodulation system further comprising:

means coupled to said converting means for detecting said transient state to produce an alarm signal representative of said transient state;

said signal supply means selecting said specific phase control signal as said phase control signal when said alarm signal is supplied thereto, and, otherwise, selecting said normal phase control signal as said phase control signal.

9. A demodulation system as claimed in claim 7, wherein said logical operation means comprises:

a read-only memory responsive to said first-set and said second-set of intermediate digital signals for producing a first and a second detection signal concerned with the areas and the zones specified by said first-set and said second-set of intermediate digital signals, respectively; and means responsive to said first and said second detection signals for producing said specific phase control signal.

10. A demodulation system as claimed in claim 7, wherein said logical operation means comprises:

means responsive to said first and said second analog demodulated signals for producing a first and second detection signal concerned with the areas and the zones specified by said first and said second analog demodulated signals; and means responsive to said first and said second detection signals for supplying said signal supply means with said specific phase control signal.

11. A demodulation system as claimed in claim 10, said demodulation system being selectively operable in a transient state and a normal state and comprising means coupled to said converting means for producing a normal phase control signal in said normal state, said demodulation system further comprising:

means coupled to said converting means for detecting said transient state to produce an alarm signal representative of said transient state;

said signal supply means selecting said specific phase control signal as said phase control signal when said alarm signal is supplied thereto and, otherwise, selecting said normal phase control signal as said phase control signal.

12. A demodulation system as claimed in claim 7, said system wherein said first-set and second-set of intermediate digital signals comprises a first pair of digital signals and a second pair of digital signals, respectively, said equalizing means comprises a transversal filter having a plurality of taps controlled by complex weighting control signals, respectively, each of which is divided into real and imaginary part weighting control signals, and a first weighting controller coupled to said converting means for producing said real part weighting control signals in response to said first-pair and said second-pair of digital signals, wherein said equalizing means further comprises:
  a second weighting controller coupled to said converting means and said logical operation means for producing said imaginary part weighting control signals in response to said first-pair and said second-pair of digital signals and with reference to both said areas and said zones.

* * * * *

UNITED STATES PATENT AND TRADEMARK OFFICE
CERTIFICATE OF CORRECTION

PATENT NO. : 4,757,266

DATED : July 12, 1988

INVENTOR(S) : Yoshida et al

It is certified that error appears in the above-identified patent and that said Letters Patent is hereby corrected as shown below:

COLUMN 4, LINE 65   Delete "ar" insert --are--;

COLUMN 8, LINE 65   Delete "$D_1$" and insert --$D_{1q}$--;

COLUMN 13, LINE 51  Delete "frist" insert --first--;

Signed and Sealed this

Third Day of January, 1989

Attest:

DONALD J. QUIGG

*Attesting Officer*    *Commissioner of Patents and Trademarks*